United States Patent [19]
Wolfe

[11] Patent Number: 4,856,579
[45] Date of Patent: Aug. 15, 1989

[54] HOT AND COLD FROSTOP FOR FOOD AND SALAD BAR

[76] Inventor: John J. Wolfe, P.O. Box 497, Savannah, Tenn. 38372

[21] Appl. No.: 184,983

[22] Filed: Apr. 22, 1988

[51] Int. Cl.$^4$ ............................................. F25B 29/00
[52] U.S. Cl. .................................. 165/48.1; 62/246; 62/458; 126/33; 165/63; 165/918
[58] Field of Search ................ 165/48.1, 63, 918, 919; 126/33, 369; 62/458, 520, 246

[56] References Cited

U.S. PATENT DOCUMENTS

| | | | |
|---|---|---|---|
| 1,480,330 | 1/1924 | Worsley | 126/33 |
| 1,560,893 | 11/1925 | Bonoff | 126/33 X |
| 1,636,393 | 7/1927 | Theaphiledes | 126/33 |
| 2,024,259 | 12/1935 | Troeber et al. | 126/33 X |
| 2,863,708 | 12/1958 | Cahn | 126/33 X |
| 2,976,391 | 3/1961 | Carlson | 126/33 X |
| 3,038,986 | 6/1962 | Molitor | 126/33 X |
| 3,308,633 | 3/1967 | Kritzer, Jr. | 62/239 |
| 3,516,485 | 6/1970 | Rhoads et al. | 165/27 |
| 3,780,794 | 12/1973 | Staub | 165/58 |
| 3,797,563 | 3/1974 | Hoffmann et al. | 165/48 |
| 3,952,794 | 4/1976 | Spanoudis | 165/2 |
| 4,250,959 | 2/1981 | Spasojevic | 165/61 |
| 4,288,991 | 9/1981 | Weeks | 62/183 |
| 4,306,616 | 12/1981 | Woods, Jr. et al. | 165/136 |
| 4,593,752 | 6/1986 | Tipton | 165/48.1 |

FOREIGN PATENT DOCUMENTS

| 100170 | 9/1897 | Fed. Rep. of Germany | 126/33 |
| 579488 | 8/1924 | France | 126/33 |

Primary Examiner—Martin P. Schwadron
Assistant Examiner—Allen J. Flanigan
Attorney, Agent, or Firm—Fleit, Jacobson, Cohn, Price, Holman & Stern

[57] ABSTRACT

A hot and cold frostop for a food and salad bar in which the unit may be utilized to maintain food products at a predetermined serving temperature regardless of whether the food products are those which are desired to be heated or those which are desired to be cooled. The hot mode is used independently of the cold mode and the unit includes removable components and a selectively operable heating unit and refrigeration unit. The heating unit is operative by heating water that is in heat exchange relation to food pans mounted removably on the unit and the refrigeration unit is provided with heat exchange tubes associated with the upper end of the unit for cooling containers having food products therein by utilizing the natural tendency of cold air to migrate downwardly around the periphery of the containers for keep them cold.

5 Claims, 3 Drawing Sheets

HOT AND COLD FROSTOP FOR FOOD AND SALAD BAR

BACKGROUND OF THE INVENTION

1. Field of the Invention

The present invention generally relates to a hot and cold frostop for a food and salad bar in which the unit may be utilized to maintain food products at a predetermined serving temperature regardless of whether the food products are those which are desired to be heated or those which are desired to be cooled. The hot mode is used independently of the cold mode and the unit includes removable components and a selectively operable heating unit and refrigeration unit. The heating unit is operative by heating water that is in heat exchange relation to food pans mounted removably on the unit and the refrigeration unit is provided with heat exchange tubes associated with the upper end of the unit for cooling containers having food products therein by utilizing the natural tendency of cold air to migrate downwardly around the periphery of the containers for maintaining them cold.

INFORMATION DISCLOSURE STATEMENT

My prior U.S. Pat. No. 4,407,143 issued Oct. 4, 1983 discloses a frosted condiment holder or frostop utilizing a refrigeration system in which the refrigerant tubes forming the evaporator of a refrigeration system is oriented at the top of a hollow pan or cavity in which the top becomes frosted and a plurality of food containers are positioned and supported from apertures in the top of the unit. The patent covering the frostop utilizes the well-known principle that cold air will migrate downwardly in the cavity thereby achieving a chilling effect along the surfaces of the containers thereby chilling or cooling the product from the top down to the bottom.

Additional prior patents are known which are relevant but not particularly pertinent to the invention. The additional prior patents are as follows:

|           |
|-----------|
| 3,308,633 |
| 3,526,485 |
| 3,780,794 |
| 3,797,563 |
| 3,952,794 |
| 4,250,959 |
| 4,288,991 |

The above-listed patents disclose relevant structures, some of which include cooling arrangements and some of which include heating arrangements, but none of them disclose the specific association of the cooling unit and heating unit utilizing hot water heat exchange medium for the heating unit in a manner similar to that disclosed and claimed in this application.

SUMMARY OF THE INVENTION

An object of the present invention is to provide a hot and cold frostop for food and salad bars utilizing a refrigeration system associated with a hollow cavity when in the cold operational mode and a quantity of hot water and a water heater and circulator associated with the hollow cavity and with the water contacting food pans along the bottom surface thereof by filling the unit with sufficient water to have the top surface of the water in engagement with the bottom area of the food pans to transfer heat thereto without scorching or overcooking the food products therein when in the hot operational mode.

Another object of the invention is to provide a hot and cold frostop in accordance with the preceding object in which the heating unit for operation in the hot mode has a water circulation capability and water heating capability with the bottom of the cavity being communicated with the water heating unit and provided with a baffle arrangement to assure even distribution of hot water being circulated by the heating unit.

A further object of the invention is to provide a hot and cold frostop in accordance with the preceding objects in which the refrigeration coils or tubes forming the evaporator of the refrigeration system are mounted on the undersurface of the top of the unit and provided with good heat conducting characteristics by a metallic material partially encapsulating the tubes and forming a large surface area for heat exchange between the evaporator tubes and the top of the unit for building up a relatively thick, readily discernible layer of frost on the upper surface of the top of the unit to provide the cooling effect necessary to maintain food products at a desired low temperature and an aesthetic appearance to the frostop when in the cold mode thereby making the food products more attractive and sellable.

Still another object of the present invention is to provide a hot and cold frostop which can be quickly and easily converted from its heating mode to its cooling mode when converting the unit from serving food products that are most desirable when heated to predetermined temperatures to food products which must be maintained under refrigeration temperatures with the unit also being easily convertible from the cold mode to the heat mode by introducing hot water from an existing domestic water supply and heating it to the desired elevated temperature by a heating device with the quantity of water being such that the top surface of the water will come into contact and heat exchange relation with the bottom surface of the food pans for transferring heat to the food but eliminating scorching and other problems of food sticking to the pans that can be caused when dry heat, electric heating elements and the like are used to maintain hot food products at an elevated temperature.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is a perspective view of one of the removable baffles that are placed in the pan or hollow cavity.

DESCRIPTION OF THE PREFERRED EMBODIMENT

Figure 1:
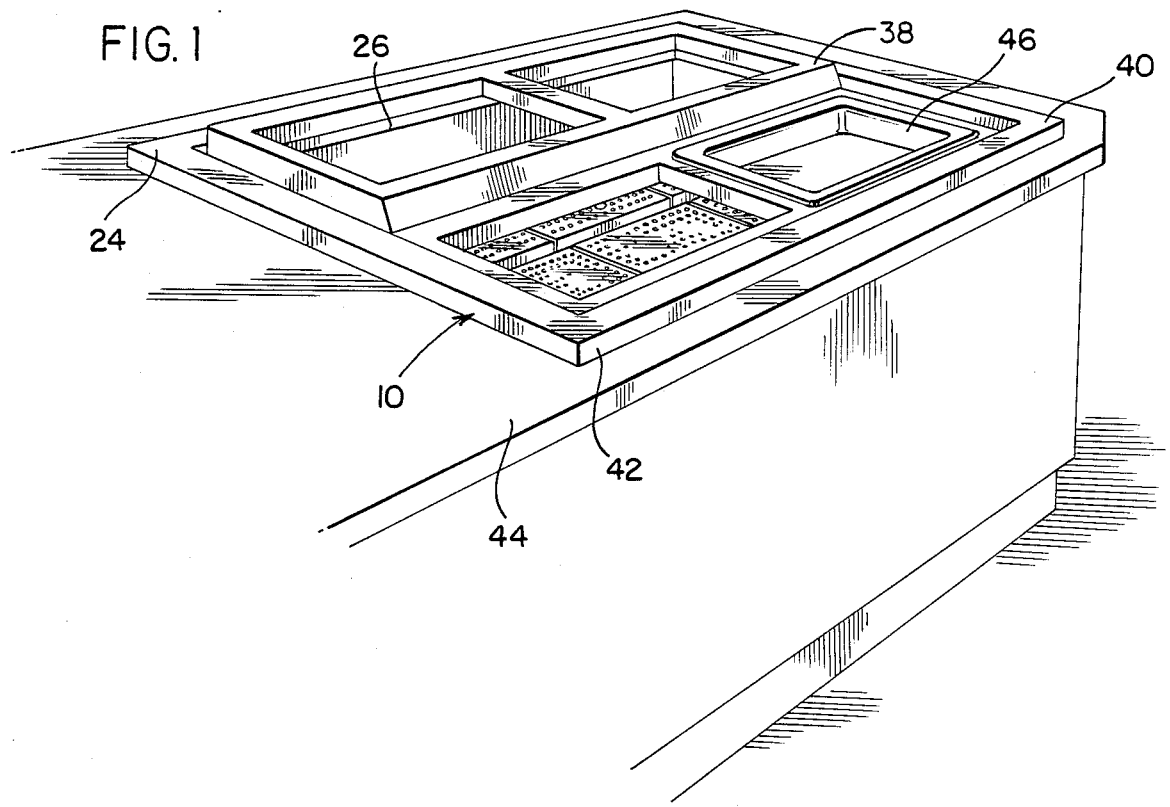
FIG. 1 is a perspective view of a hot and cold frostop unit incorporating the features of the present invention therein.

Referring now specifically to the drawings, the hot and cold frostop unit of the present invention is generally designated by reference numeral 10 and includes in its construction a generally rectangular hollow pan designated by reference numeral 12 which includes a bottom wall 14, side walls 18 and end walls 20. The pan 12 forms a large hollow cavity 22 which has a top generally designated by numeral 24 which has openings 26 therein. The pan is surrounded by a generally concentric outer wall 28 defining a spaced wall and bottom arrangement with the space being filled with insulation material 30. The undersurface of top 24 and the outer surface of walls 18 and 20 are provided with refrigerant tubes 32 that are the evaporative section of a conventional refrigeration system (not shown) and these tubes cool the walls and top 24 when in the cold mode. This structure is basically that which is disclosed in prior U.S. Pat. No. 4,407,143 which is incorporated herein by reference thereto. Also as disclosed in that patent, the pan is provided with a drain structure 34 and spray nozzles 36 at the opposite ends thereof which operate in the same manner as in the above-mentioned patent.

As illustrated, the top 24 has a raised or elevated portion 38 and a lower portion 40. However, the top also includes a laterally extending and downturned flange 42 which is supported on a countertop 44 or the like with the pan and outer wall depending through an opening in the countertop. The surfaces of the top have the refrigerant tubes oriented substantially throughout their lateral extent to form a relatively thick frost on the outer surface when in the cold mode. Food pans 46 are positioned in the openings with the bottoms of the pans depending into the cavity 22. As an alternative to the use of rectangular pans and rectangular openings, circular openings and circular food containers may be supported therein in the manner illustrated in the above mentioned patent.

Figure 7:
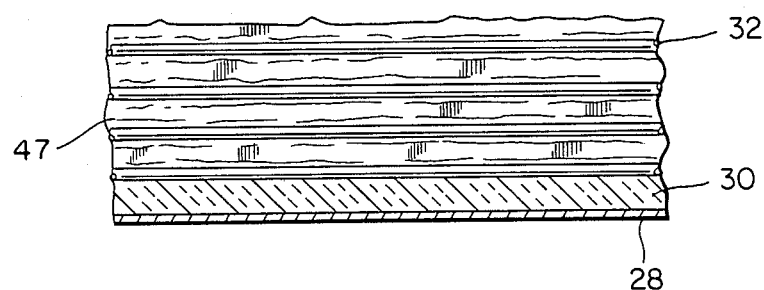
FIG. 7 is a detailed, sectional view taken along section line 7—7 on FIG. 6 illustrating the structure of the cooling coils and their association to the side walls of the pan including the metallic material partially encapsulating the coils.

As illustrated in FIG. 7, the tubes 32 forming the evaporator are secured to the wall surface or top by the use of a lead material 47 in which the lead material partially encapsulates and increases the heat exchange area of contact between the cylindrical surface of the tube and the flat surface of the pan or top thereby enhancing and increasing the heat transfer from the refrigeration tubes to the walls and top. The lead material 47 is completely isolated from the food products and is utilized to not only secure the tubes 32 in place but also partially encapsulate them to enhance the heat transfer in order to more effectively cool the cold surfaces and the interior of the cavity 22.

Figure 2:
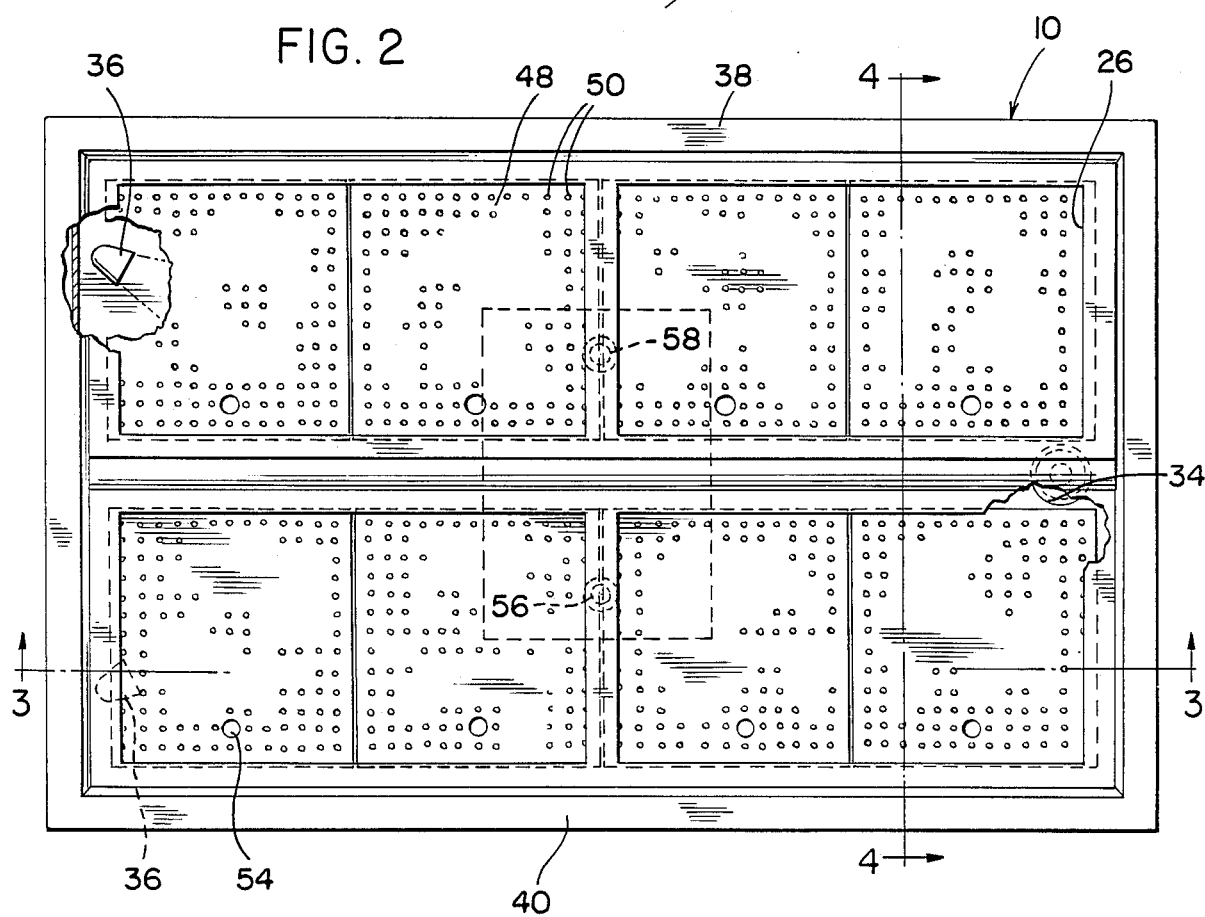
FIG. 2 is a top plan view of the construction of FIG. 1 with the food pans completely removed.
Figure 4:
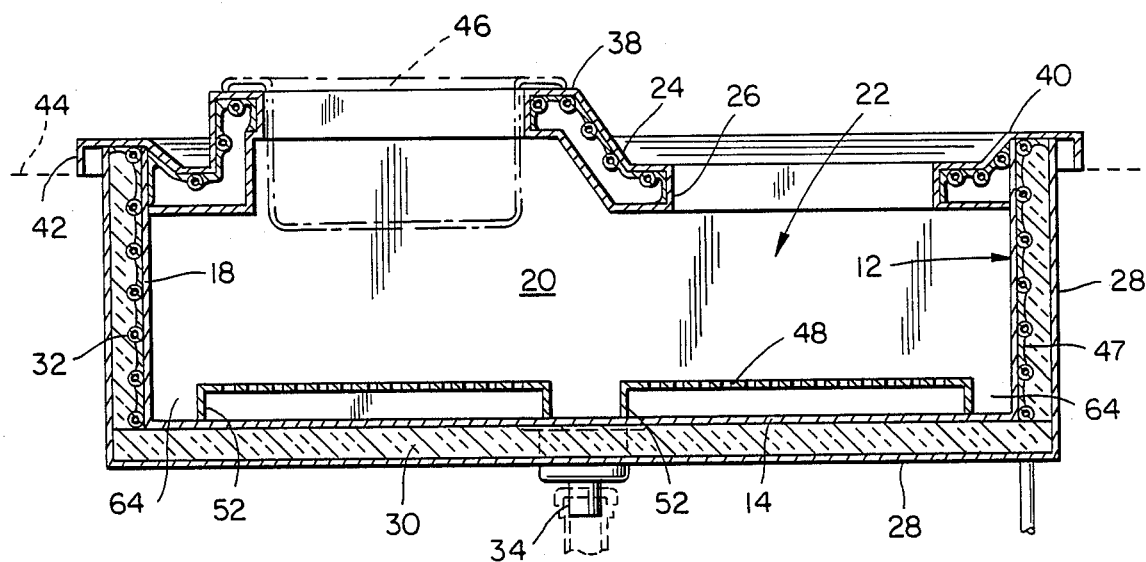
FIG. 4 is a transverse, sectional view taken substantially upon a plane passing along section line 4—4 on FIG. 2 illustrating the structural arrangement of the components when in a cold mode.
Figure 6:
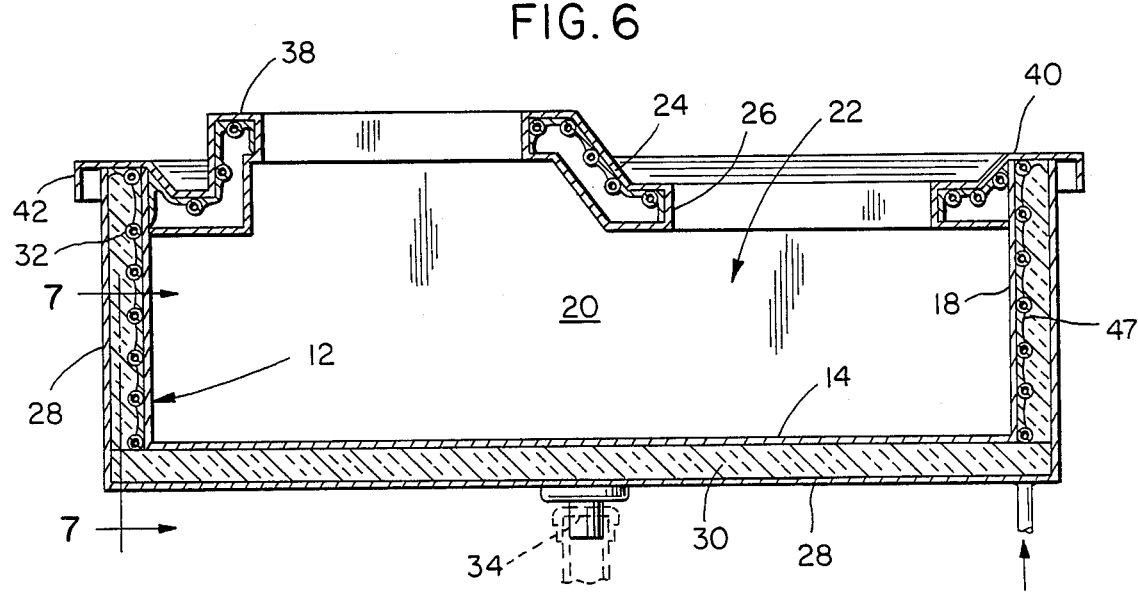
FIG. 6 is a transverse, sectional view similar to FIG. 4 but illustrating the unit in its cold mode.

Positioned in the pan 12 is a plurality of rectangular baffle plates 48 each of which is provided with a plurality of relatively small apertures or perforations 50 therein. Two opposed side edges of the baffle plate 48 is provided with downturned or downwardly extending supporting flanges 52 which rest on the bottom 14 of the pan 12 and support the baffle plate above the bottom 14 of the pan 12 with the plate 48 being generally in spaced parallel relation to the bottom 14. A larger finger receiving opening 54 is provided in each baffle plate 48 adjacent one edge thereof to enable a person to extend a finger through the opening 54 and lift the baffle plate 48 upwardly for removal and for insertion of the baffle plate into the pan 12. The baffle plates 48 may be removed from the pan 12 through the openings 26 since they are not used when in the cold mode but only during use of the invention in the hot mode. The flanges 52 support the baffle plates which are arranged as illustrated in FIG. 2 with the baffle plates being in spaced relation transversely of the pan as illustrated in FIG. 4 with the baffle plates being aligned and abutting in end-to-end relation but spaced laterally at the center. Also, the remote side edges of the adjacent baffle plates are spaced from the side walls 18 of the pan and the ends of the baffle plates are spaced from the end walls 20 to provide for circulation of hot water in relation to an inlet 56 and an outlet 58 formed in the pan 12 with the water inlet 56 and the water outlet 58 being laterally spaced from each other and generally located centrally of the bottom of the pan 12. The water inlet 56 and the water outlet 58 are in communication with a water heating and circulating device generally designated by reference numeral 60 that is supported in any suitable manner below the pan 12 and provided with electrical conductors 62 for supplying electrical energy to the heating unit.

Figure 3:
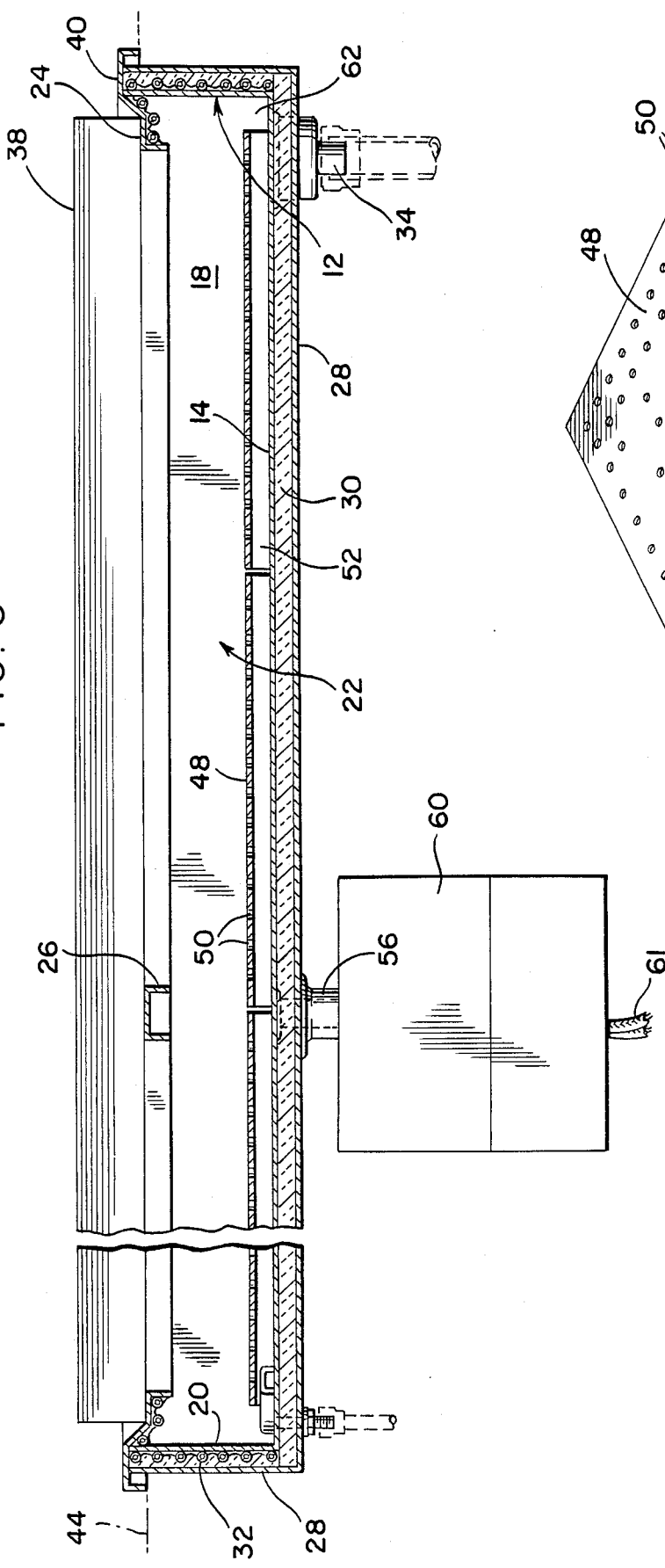
FIG. 3 is a longitudinal, sectional view taken substantially upon a plane passing along section 3—3 on FIG. 2 illustrating the structural details of the invention.

The unit 60 is a commercially available unit such as a Bain-Marie heater/food reconstitutor that is available from Hatco Corporation, Milwaukee, Wis. The unit 60 receives water from the interior of the pan 12, heats it and discharges it back into the pan 12 with the unit 60 including a circulating pump and heating unit of sufficient capacity to maintain the water in the pan at a desired temperature level when in the hot mode. The fact that the baffles include flanges 52 only on the side edges provides a space between the baffle plates 48 and the bottom 14 of the pan 12 for circulation of water under the baffle plates 48, upwardly through the apertures 50 and upwardly around the outer ends of a plurality of aligned and abutting baffle plates 48 with the end space between the baffle plates 48 and the end walls 20 being designated by numeral 62 and the side space between the flanges 52 on the baffle plates 48 and the side walls 18 being designated by numeral 64 in FIG. 4. As illustrated in FIG. 3, the drain 34 is located adjacent one end wall 20 and the nozzles 36 are located adjacent the opposite end wall 20 in a manner similar to that disclosed in my above-mentioned prior patent.

The drain 34 is a standard drain with a basket assembly and is connected to the drain system of a restaurant or other establishment in a conventional manner and the spray nozzles 36 are connected to a domestic hot water supply in a conventional manner with accepted plumbing practices being used. Likewise, the heating unit is connected to the electrical system in any suitable manner and, optionally, a heater using a gas-type heating unit may be employed and connected to a supply of gas in accordance with standard practice. The stairstep elevated section 38 provides for optimum display and accessibility of the food products in the food trays 46. The openings 26 may be of different shapes and sizes as may the food trays or pans 46. Also, the side edge flanges 42 may be of various configurations and may be provided with a downwardly opening peripheral groove with a seal such as a neoprene strip which engages the countertop. The components engaged with the food are preferably of stainless steel or other similar material and the shape, size and configuration of the unit may be varied depending upon the installational requirements. The openings may be provided with food trays such as hotel pans commonly employed in food serving lines or food bars and may be of varying heights and depths with the water line in the pan 12 being such as to have the bottom surface of the food tray or container in contact with the water surface when in the hot mode. This assures heat transfer to the food products without scorching and without overcooking of the food products which can occur when dry heat or other types of heating devices are used.

As indicated, the unit can be operated either hot or cold and the heater unit supplies the heat for hot operation and the baffle plates of stainless steel provide even water circulation throughout the pan 12. When the device is converted to cold operation, the water in the pan is drained and the baffle plates removed. The pan may be flushed or washed and any material therein discharged through the drain with the water also being discharged through the drain. When converting from hot to cold, after the water has been drained, the baffles are removed and the pan flushed if necessary. The heater, which has been turned off, includes a thermostat or a timer in the heater circuit which will not allow operation of the refrigeration system by not allowing operation of the compressor for a predetermined time period or until the temperature in the pan reaches a preset lower temperature. Operation of the refrigeration system will cool the pan and the interior cavity thereof and the food products that are supported from the top 24. An insert with circular apertures may be positioned on the top or in the openings 26 and supported from the periphery thereof with the containers depending through the apertures and supported around the periphery thereof in the same manner as in the above-mentioned prior patent. By operation of the refrigeration system, there is a buildup of frost that may be $\frac{1}{8}$" to $\frac{1}{4}$" thick which provides an aesthetically pleasing appearance and considerable eye appeal to the customer who will readily recognize that the food products are maintained at a desired low temperature. The frost also enables garnish such as endive, kale and similar greens to further enhance the food product and render it more sellable when in the cold mode. Also, the downward migration of cold air from the cooling tubes which are located on the top 24 and along the side and end walls produces a chilling effect throughout the vertical height of the food product containers supported in the openings 26.

When converting from cold mode to hot, the refrigeration system is turned off and, if necessary, the pan can be flushed by using the spray nozzles 36 and drain 34. The baffle plates are positioned in the pan 12 and the pan filled with water either from the spray nozzles or by independent hose or the like connected to a domestic hot water supply which will usually supply water heated to approximately 140° F. The water level in the pan will be maintained in contact with the bottom surface portions of the pans 46 and the heating unit 60 is turned on and will rapidly raise the temperature of the water from 140° F. to a desired operating temperature up to but usually not exceeding 180° F. to prevent overcooking of any reconstituted food in the food pans or trays.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A hot and cold frostop unit for food and salad bars comprising a pan including a bottom wall and a peripheral wall enclosing a hollow cavity and a top for the pan, said top including at least one opening for supporting a food container, means in heat exchange relation to the top and peripheral wall for cooling the top and hollow cavity and to form frost on the upper surface of the top around the periphery of the opening and the food container supported therein when in a cold operational mode, a water heating unit communicated with the pan for circulating a quantity of water and heating the water to a desired temperature in relation to the cavity in the pan when in the hot operational mode with the water in the pan being in heat exchange relation to the food container supported in the top opening, and a baffle plate mounted in the pan in spaced relation to the bottom of the pan, said baffle having side and end edges, said baffle plate including a laterally extending flange engaging the bottom of the pan, said side and end edges being spaced from the peripheral wall of the pan, the water heating unit including an inlet and outlet in the bottom of the pan for circulating water with hot water entering the pan being evenly distributed by the baffle plate.

2. The structure as defined in claim 1 wherein the pan in mounted in said unit at a level so that hot water in the pan is in heat exchange contacting relation to the bottom of the food container to prevent scorching and overcooking of the food in the food container.

3. The structure as defined in claim 1 wherein the means for cooling the top and walls of the pan includes tubes forming the evaporator of a refrigeration system with the tubes being secured to the cold surfaces of the pan and top by a metallic material partially encapsulating the tubes to increase heat exchange between the tubes and pan.

4. The structure as defined in claim 1 wherein said top includes portions at different elevations and multiple openings for receiving multiple food containers with the food containers being oriented at different elevations to provide a stairstep display of the food products to increase visibility and accessibility of the food products to persons serving themselves.

5. A hot and cold frostop unit for food and salad bars comprising a pan including a bottom wall and a peripheral wall enclosing a hollow cavity and a top for the pan, said top including at least one opening for supporting a food container, means in heat exchange relation to the top and peripheral wall for cooling the top and hollow cavity and to form frost on the upper surface of the top around the periphery of the opening and the container supported therein when in a cold operational mode, a water heating unit communicated with the pan for circulating a quantity of water and heating the water to a desired temperature in relation to the cavity in the pan when in the hot operational mode with the water in the pan being in heat exchange relation to the food container supported in the top opening, and baffle means disposed in the pan, said baffle means including a plurality of perforated plates having parallel side and end edges, each side edge of each baffle plate including a laterally extending flange with the flanges engaging the bottom of the pan to support the perforated plates in spaced relation to the bottom of the pan, said heating unit including a water inlet and outlet associated with the pan for circulation of water through the heating unit and back into the pan with water entering the pan entering under the baffle plates for more even distribution of heated water up through the perforated plates, the endmost edges of a plurality of abutting baffle plates being spaced from the peripheral wall of the pan to provide circulation around the ends of a plurality of abutting baffle plates.

* * * * *